(12) United States Patent
Yamada (10) Patent No.: US 7,832,806 B2
(45) Date of Patent: Nov. 16, 2010

(54) SEAT APPARATUS FOR VEHICLE (75) Inventor: Yukifumi Yamada, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 815 days.

(21) Appl. No.: 11/494,580

(22) Filed: Jul. 28, 2006

(65) Prior Publication Data
US 2007/0029860 A1 Feb. 8, 2007

(30) Foreign Application Priority Data
Aug. 3, 2005 (JP) ............... 2005-225397

(51) Int. Cl.
B60N 2/68 (2006.01)
(52) U.S. Cl. ............... 297/440.15; 297/440.2
(58) Field of Classification Search ............ 297/440.1, 297/440.15, 440.16, 440.2
See application file for complete search history.

(56) References Cited

U.S. PATENT DOCUMENTS

| 4,775,126 | A | * | 10/1988 | Yokoyama | ............ 248/430 |
| 4,863,219 | A | * | 9/1989 | Ochiai | ............ 297/452.11 |
| 5,165,756 | A | * | 11/1992 | Baker et al. | ............ 297/354.12 |
| 5,671,974 | A | * | 9/1997 | Boycott et al. | ............ 297/440.2 |
| 6,488,339 | B1 | * | 12/2002 | Finner et al. | ............ 297/440.16 |
| 6,698,840 | B1 | * | 3/2004 | Tseng | ............ 297/440.15 |
| 2001/0006302 | A1 | * | 7/2001 | Nagayasu et al. | ............ 297/440.15 |
| 2004/0084945 | A1 | | 5/2004 | Toba et al. | |
| 2004/0155509 | A1 | * | 8/2004 | Smith, Jr. | ............ 297/440.15 |
| 2006/0138842 | A1 | | 6/2006 | Behrens | |

FOREIGN PATENT DOCUMENTS

| CN | 1792670 A | 6/2006 |
| DE | 100 41 655 A1 | 3/2002 |
| DE | 101 10 529 A1 | 9/2002 |
| EP | 0 359 406 A2 | 3/1990 |
| FR | 2 842 476 A1 | 1/2004 |
| JP | 2001-271814 A | 10/2001 |
| JP | 2004-81390 | 3/2004 |

OTHER PUBLICATIONS

Official Action issued in CN Patent Appln. No. 2006101092504 Nov. 28, 2008, State Intellectual Property Office of People's Republic of China, CN; and English-language translation thereof.
Extended European Search Report issued by the European Patent Office in corresponding EP Patent Application No. 06 11 8339, Feb. 3, 2010; EPO, Munich, DE.

* cited by examiner

Primary Examiner—Peter R. Brown
(74) Attorney, Agent, or Firm—Buchanan Ingersoll & Rooney PC (57) ABSTRACT A seat apparatus for a vehicle includes a seat cushion frame, a lower bracket fixed to the seat cushion frame, a seatback frame attached to the lower bracket through a reclining mechanism so as to be pivotally supported relative to the lower bracket, two fastening portions fastening the lower bracket and the seat cushion frame, and an engaging portion engaging the lower bracket and the seat cushion frame.

17 Claims, 6 Drawing Sheets

SEAT APPARATUS FOR VEHICLE

This application is based on and claims priority under 35 U.S.C. §119 to Japanese Patent Application 2005-225397, filed on Aug. 3, 2005, the entire content of which is incorporated herein by reference.

FIELD OF THE INVENTION

The present invention relates to a seat apparatus for a vehicle provided with a seat cushion frame, a lower bracket fixed to the seat cushion frame, and a seatback frame mounted to the lower bracket through a reclining mechanism so as to be pivotally supported by the lower bracket.

BACKGROUND

A seat apparatus for a vehicle such as an automobile, or the like, which is capable of adjusting an angle between a seat cushion serving as a seating portion and a seatback serving as a backrest portion, is known. This type of seat apparatus is provided with a seat cushion frame, a lower bracket fixed to the seat cushion frame, and a seatback frame mounted to the lower bracket through a reclining mechanism so as to be pivotally supported by the lower bracket.

According to the conventional seat apparatus for a vehicle disclosed in JP2004-81390A, the seatback frame is pivotally supported relative to the lower bracket through the reclining mechanism and the lower bracket is fixed to the seat cushion frame by means of two bolts. Thereby, an angle of the seatback relative to the seat cushion and the lower bracket is adjustable. For example, when an occupant is leaned on the seatback in a condition where the lower bracket is fastened and fixed to the seat cushion frame by means of one bolt, the force for pushing the seatback frame reward (i.e., a direction perpendicular to an axis line direction of a rotational shaft of the seat back frame) is generated and problem of rotating the lower bracket by making the one bolt as a support point may occur. However, according to the seat apparatus for a vehicle disclosed in JP2004-81390A, the lower bracket is fastened and fixed to the seat cushion frame by means of the two bolts. Therefore, even when the force for rotating the lower bracket by making one of the two bolts as the support point is applied to the direction perpendicular to the axis line direction of the rotational shaft of the seatback frame, the force can be received by the other bolt.

With the configuration of the seat apparatus for a vehicle disclosed in JP2004-81390A, the lower bracket is fixed to the seat cushion frame by means of the two bolts for preventing a relative rotation thereof. However, if the force for reclining the seatback frame reward is increased, the force for rotating the lower bracket by making the one bolt as the support point may highly be increased. On this occasion, the one bolt may be applied with an excessive shearing force. Accordingly, if large load is applied to the one of the two bolts, the bolt may be damaged. Further, the lower bracket and the seat cushion frame, which are in contact with the bolt, may be deformed. In order to prevent the one bolt from being applied with the large load, the lower bracket can be fixed to the seat cushion frame by means of more than two bolts so that the load may be dispersed to plural bolts. However, as the number of the bolts is increased, the problem of increasing the number of processes for fastening the lower bracket to the seat cushion frame may occur. Further, the problem of increasing the weight of the seat apparatus for a vehicle may occur.

The present invention has been made in view of the above circumstances, and provides a seat apparatus for a vehicle which can firmly connect the lower bracket with the seat cushion frame with a simple structure.

SUMMARY OF THE INVENTION

According to an aspect of the present invention, a seat apparatus for a vehicle includes a seat cushion frame, a lower bracket fixed to the seat cushion frame, a seatback frame attached to the lower bracket through a reclining mechanism so as to be pivotally supported relative to the lower bracket, two fastening portions fastening the lower bracket and the seat cushion frame, and an engaging portion engaging the lower bracket and the seat cushion frame.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Embodiments of the present invention will be described hereinbelow with reference to the attached drawings. Roughly classified, a seat apparatus for a vehicle is comprised of a seat cushion 6, on which an occupant is seated, and a seatback 1 serving as a backrest portion. The seat cushion 6 is provided, therein, with seat cushion frames 8 serving as a frame thereof and the seatback 1 is provided, therein, with seatback frames 2 serving as a frame thereof. Lower brackets 7 are respectively attached to each end of the seat cushion frames 8. Each lower bracket 7 is rotatably and slidably attached to each reclining mechanism 3 fixed to each seatback frames 2. Reclining mechanisms 3 are supported by pins 5a and 5b, which are inserted into each bearing hole 19 formed on each reclining mechanism 3, so that a rotation of the reclining mechanisms 3 can be controlled.

Figure 1:
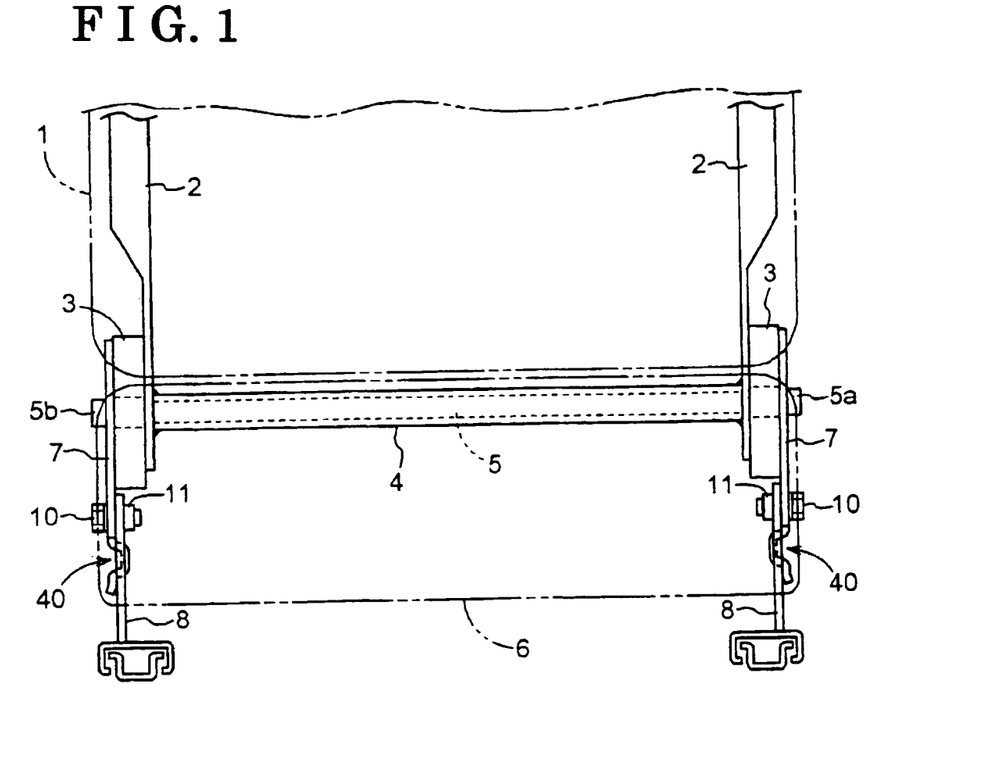
FIG. 1 is a front view of a seat apparatus for a vehicle.
Figure 3:
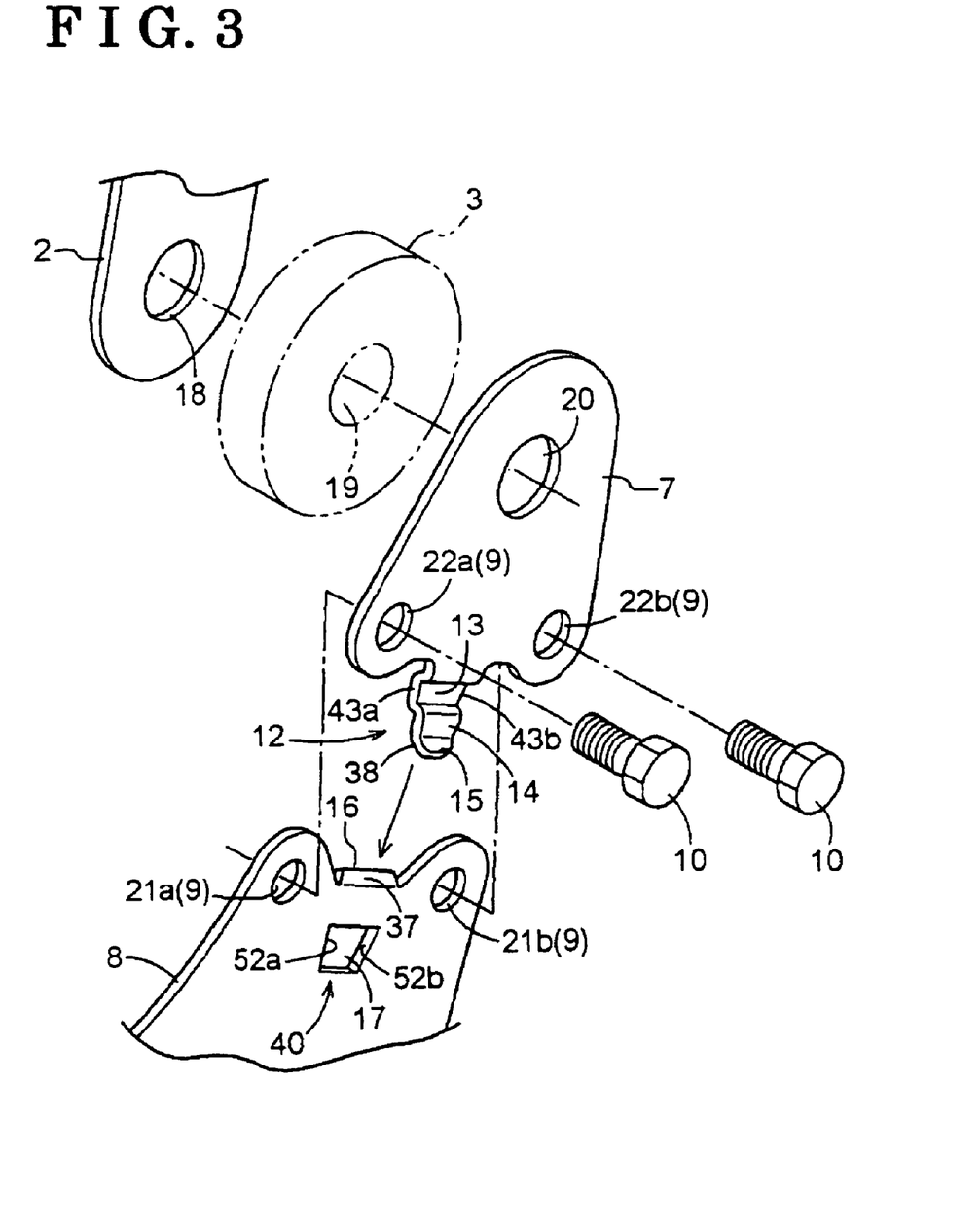
FIG. 3 is an exploded perspective view of the seat apparatus for a vehicle according to the first embodiment of the present invention.

Arranged between the seatback frames 2 are an outer shaft 4, having a hollow portion, and an inner shaft 5 rotatably provided in the outer shaft 4. As illustrated in FIGS. 1 and 3, each end of the outer shaft 4 is fixed to each bearing hole 18 of each seatback frame 2 by welding. Pins 5a and 5b are respectively fixed to each end of the inner shaft 5. Each one of pins 5a and 5b is rotatably inserted through each bearing hole 18 of each seatback frame 2, and is fixed to each bearing hole 19 of each reclining mechanism 3, as well as to each bearing hole 20 of each lower bracket 7. More specifically, the inner shaft 5 is fixed to the lower brackets 7 through the pins 5a and 5b. Therefore, if the reclining mechanisms 3 are not provided, the seatback frames 2 and the outer shaft 4 are freely rotatable relative to the lower brackets 7 and the inner shaft 5. According to the present invention, the reclining mechanisms 3 control the rotation of the seatback frames 2 and the outer shaft 4 relative to the lower brackets 7 and to the inner shaft 5.

As one procedure of manufacturing the seat apparatus for a vehicle, an upper portion and a lower portion are separately manufactured and then both portions are assembled. First, the seatback frames 2, the outer shaft 4, the inner shaft 5 and the pins 5a and 5b are assembled to form the seatback portion. Then, the reclining mechanisms 3 and the lower brackets 7 are respectively assembled to right and left bottom ends of the seatback portion. Accordingly, the upper portion of the seat apparatus for a vehicle, which includes the seatback frames 2, the outer shaft 4, the inner shaft 5, the pins 5a and 5b, the reclining mechanisms 3, and the lower brackets 7, is manufactured. The seatback frames 2 are rotatable relative to the lower brackets 7 through the reclining mechanisms 3. Accordingly, the outer shaft 4 represents a rotational shaft of the seatback frame of the present invention.

The lower portion of the seat apparatus for a vehicle is comprised of the seat cushion frames 8. The upper portion performs positioning relative to the lower portion while sliding so that a fixation of the upper portion and the lower portion by means of bolts 10 and nuts 11 at fastening portions 9 can be performed. At the time of assembling the lower brackets 7 and the cushion frames 8, right and left lower brackets 7 are placed outside of the cushion frames 8 in an axial direction of the outer shaft 4 and are in contact with the cushion frames 8. The lower brackets 7 sandwich cushion frames 8 from both sides in the axial direction of the outer shaft 4. Then, the lower brackets 7 of the upper portion and the seat cushion frames 8 of the lower portion are fixed by means of the bolts 10 and nuts 11 at the fastening portions 9. Two fastening portions 9 are provided at each lower bracket 7 and each cushion frame 8 at right and left sides thereof.

As described above, each lower bracket 7 and each seat cushion frame 8 are fastened or firmly attached and secured by means of two bolts 10 at the right and left sides respectively. The seatback frames 2 are rotatable relative to the lower brackets 7 and the cushion frames 8 through the reclining mechanisms 3. Therefore, an angle of the seatback frames 2 relative to the cushion frames 8 can be adjustable by means of an operation apparatus (not shown) comprised of a lever, a switch, or the like. Alternatively, or in addition, an adjustment of the angle of the seatback frames 2 may be performed by means of an electric motor (not shown) or a pressing force of the occupant.

According to the present invention, the configuration of the left and right sides of the seat apparatus to a direction of travel are plane symmetry. Therefore, only the configuration of the left side of the seat apparatus to the direction of travel will be illustrated and explained in the following embodiments.

FIRST EMBODIMENT

Figure 2:
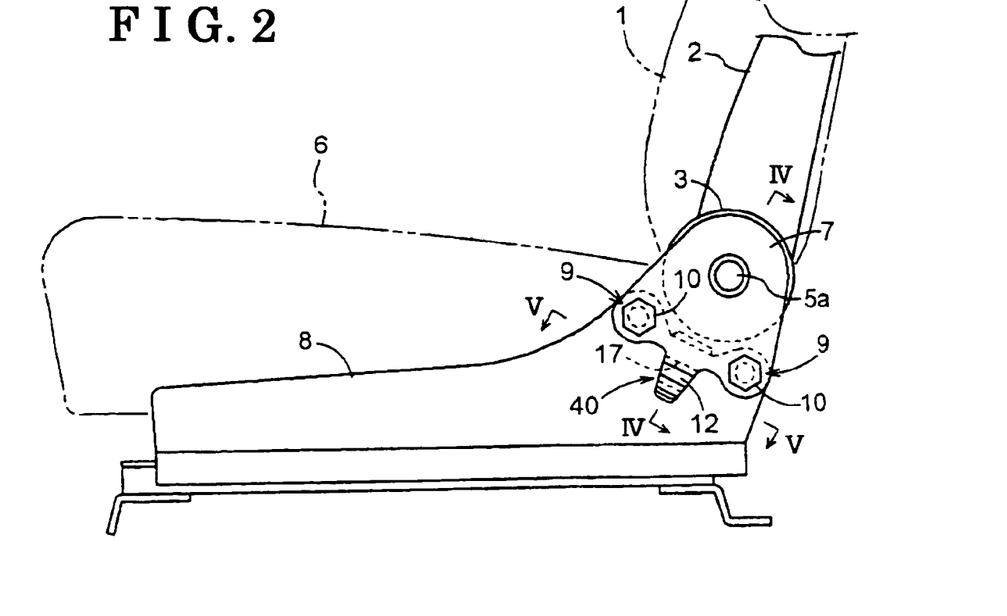
FIG. 2 is a side view of a seat apparatus for a vehicle according to a first embodiment of the present invention.

A first embodiment of the present invention will be described hereinafter. As illustrated in FIGS. 1-5, the planar lower bracket 7 is fastened and fixed to the planar seat cushion frame 8 at the two fastening portions 9. More specifically, as illustrated in FIGS. 2 and 3, fastening holes 22a and 22b are provided at the lower bracket 7 and the fastening holes 21a and 21b are provided at the seat cushion frame 8 corresponding to the fastening holes 22a and 22b. In a condition where the fastening hole 21a is mated with the fastening hole 22a and the fastening hole 21b is mated with the fastening hole 22b and the positioning is performed, the bolts 10 are inserted through the fastening holes 21a, 21b, 22a, and 22b, and the lower bracket 7 and the seat cushion frame 8 are fastened or firmly attached to each other by means of the nuts 11.

An engaging portion 40, at which the lower bracket 7 and the seat cushion frame 8 are engaged, is provided between the fastening portions 9. The engaging portion 40 is deviated from a straight line connecting the two fastening portions 9, i.e., the engaging portion 40 is not placed on the straight line connecting the two fastening portions 9. The engaging portion 40 is comprised of a lower bracket engage portion 13 and a seat cushion frame engage portion 17. More particularly, the planar lower bracket 7 is provided with a protrude portion 12 protruding in plane with the lower bracket 7. The protrude portion 12 includes a tip portion 14, which configures a tip of the protrude portion 12, and the lower bracket engage portion 13, which is provided at a base side of the protrude portion 12 relative to the tip portion 14. The lower bracket engage portion 13 is engageable with the engage portion 17 provided at the seat cushion frame 8. The engage portion 17 is a through hole provided at the seat cushion frame 8 and the engage portion 13 is formed by bending the protrude portion 12 of the lower bracket 7 so that the engage portion 13 can be fitted into the through hole. A size of the through hole of the engage portion 17 is applicable as long as the engage portion 13 can be fitted thereto.

As described above, the lower bracket 7 and the seat cushion frame 8 are connected with each other at practically three portions, i.e., at the two fastening portions 9 and the engaging portion 40. Accordingly, if the lower bracket 7 is rotated rearward with the seatback frame 2 by making a first fastening portion 9 (the bolt 10 and the nut 11) as a support point due to an application of a large load relative to the seatback frame 2 from the front side toward the rear side, a rotation force is dispersed and received at a second fastening portion 9 and the engaging portion 40 (the lower bracket engage portion 13 and the seat cushion frame engage portion 17). According to the first embodiment of the present invention, it can be prevented from applying the large load to only one of the two fastening portions 9 and the engaging portion 40. Further, occurrence of deforming the lower bracket 7 and the seat cushion frame 8 can be prevented.

According to the first embodiment of the present invention, the engaging portion 40 is formed into substantial rectangle, i.e., the lower bracket engage portion 13 and the seat cushion frame engage portion 17 are formed into substantial rectangle. Further, inner surfaces 52a and 52b of the engage portion 17 are in contact with side surfaces 43a and 43b of the engage portion 13 within a plane perpendicular to an axial direction of the outer shaft 4. Therefore, even in a condition where the lower bracket 7 and the seat cushion frame 8 are not fastened and fixed by means of the bolts 10 and the nuts 11, an engagement of the lower bracket 7 and the seat cushion frame 8 remains and a relative rotation of the lower bracket 7 and the seat cushion frame 8 by making the outer shaft 4 as the rotational shaft can be restricted. According to the first embodiment of the present invention, if the lower bracket 7 and the seat cushion frame 8 are engaged, the relative rotation thereof and a position gap therebetween can be prevented. Because of the engagement of the engage portion 13 and the engage portion 17 at the engaging portion 40, the positioning of the lower bracket 7 and the seat cushion frame 8, performed prior to the aforementioned fixation of the lower bracket 7 and the seat cushion frame 8, can be facilitated. Accordingly, the inner surfaces 52a and 52b of the seat cushion frame engage portion 17 and the side surfaces 43a and 43b of the lower bracket engage portion 13 represent a restricting surface according to the present invention.

In a condition where a load is applied to the seatback frame 2 from the right and left sides of the seat apparatus, a force may be applied for folding the lower bracket 7 and the seat cushion frame 8 by malting the straight line connecting the two fastening portions 9 provided at the lower bracket 7 as a folding line. However, according to the first embodiment of the present invention, each engaging portion 40 provided at the right and left sides of the seat apparatus is provided between the two fastening portions 9 and is deviated from the straight line connecting the two fastening portions 9. More specifically, the lower bracket engage portion 13 of the engaging portion 40 is provided between the two fastening portions 9 and is deviated from the straight line connecting the two fastening portions 9. Further, the lower bracket engage portion 13 presses the seat cushion frame 8 from the side surface thereof and a part of the load can be borne by the lower bracket engage portion 13. Therefore, the force for folding the lower bracket 7 can be eased and the problem of deforming the lower bracket 7 and the seat cushion frame 8 can be prevented.

Figure 4:
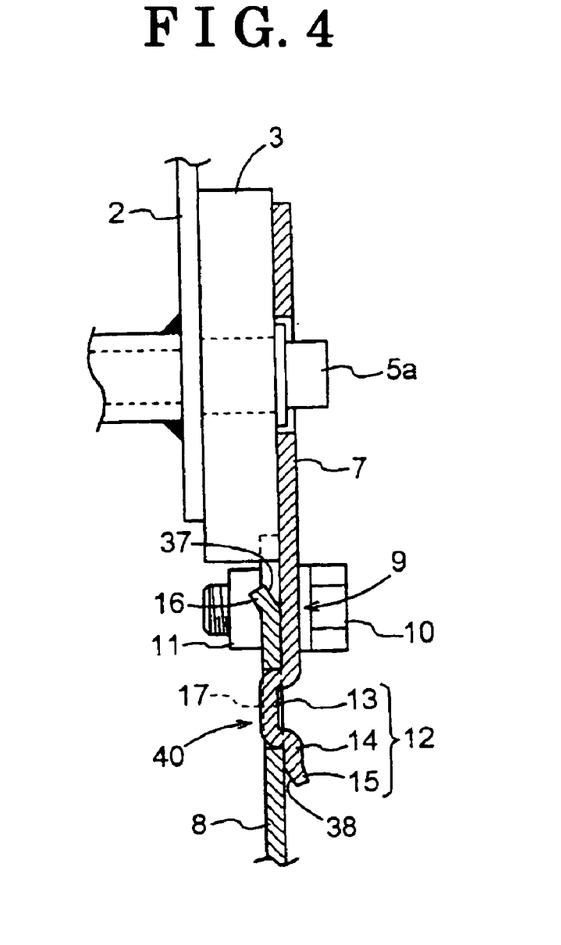
FIG. 4 is a sectional view of a contact portion between a lower bracket and a seat cushion frame according to the first embodiment of the present invention (a sectional view taken along line IV-IV of FIG. 2.
Figure 5:
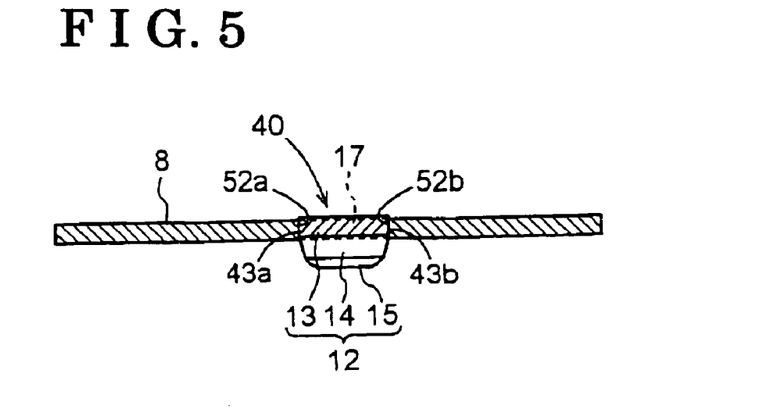
FIG. 5 is a sectional view of an engaging portion of the seat apparatus for a vehicle according to the first embodiment of the present invention (a sectional view taken along line V-V of FIG. 2.

As illustrated in FIG. 4, an inclined surface 38 is formed at an end portion of the lower bracket 7 and an inclined surface 37 is formed at an end portion of the seat cushion frame 8. In a condition where the lower bracket engage portion 13 and the seat cushion frame engage portion 17 are engaged at the engaging portion 40, the engage portion 13 is in contact with the inclined surface 37 and is guided to the engage portion 17. The inclined surfaces 37 and 38 are configured so that the inclined surface 37 is bent away from the lower bracket 7 toward a tip of the end portion of the seat cushion frame 8 and the inclined surface 38 is bent away from the seat cushion frame 8 toward a tip of the end portion of the lower bracket 7. In other words, the inclined surfaces 37 and 38 are separated away from each other along the axial direction of the outer shaft 4 (an axial direction of the rotational shaft of the seatback frame 2) toward the tip of the end portions of the lower bracket 7 and the seat cushion frame 8. More specifically, in a condition where the lower bracket 7 and the seat cushion frame 8 are fixed and in contact with each other, an end portion (the tip portion 14) of a contact portion of the lower bracket 7 is formed into a reflex portion 15 (the inclined surface 38) which is bent so as to be apart from the seat cushion frame 8. Further, an end portion of a contact portion of the seat cushion frame 8 is formed into a reflex portion 16 (the inclined surface 37) which is bent so as to be apart from the lower bracket 7. Accordingly, when the lower bracket engage portion 13 and the seat cushion frame engage portion 17 are engaged in a condition where the upper portion and the lower portion of the seat apparatus are assembled, the lower bracket 7 and the seat cushion frame 8 can relatively be moved along the axial direction of the outer shaft 4 by contacting the inclined surface 38 of the lower bracket 7 with the inclined surface 37 of the seat cushion frame 8. The lower bracket engage portion 13 represents an engage portion of the lower bracket and the seat cushion frame engage portion 17 represents an engage portion of the seat cushion frame.

Accordingly, even when the lower bracket 7 and the seat cushion frame 8 are placed apart from each other along the axial direction of the outer shaft 4 in a condition where the positioning of the lower bracket 7 and the seat cushion frame 8 is performed, the positioning of the lower bracket 7 and the seat cushion frame 8 can appropriately be performed. Further, the right and left seat cushion frames 8 can readily be fitted to an inside of each lower bracket 7. In other words, the right and left lower brackets 7 can reliably sandwich and slide at the outside of the right and left seat cushion frames 8 without being mistakenly placed at the inside of the right and left seat cushion frames 8. In consequence, an assembling of the upper portion and the lower portion of the seat apparatus can readily be performed.

SECOND EMBODIMENT

A second embodiment of the present invention will be described herein after. The same structure as described in the aforementioned embodiment is not repeatedly explained.

Figure 6:
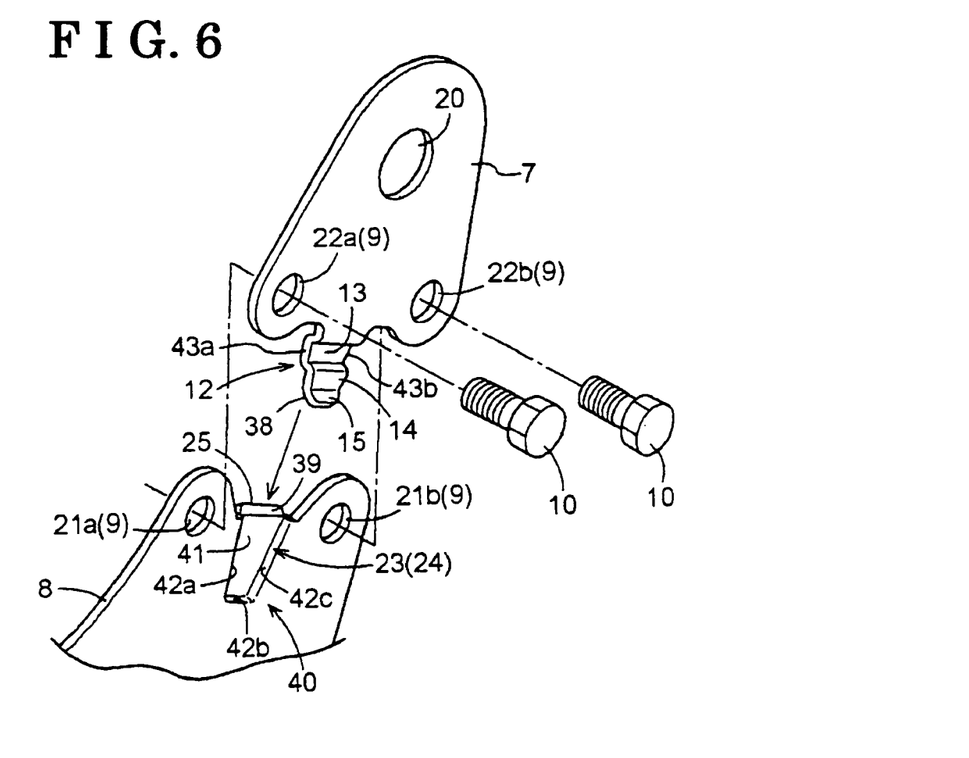
FIG. 6 is an exploded perspective view of a seat apparatus for a vehicle according to a second embodiment of the present invention.
Figure 7:
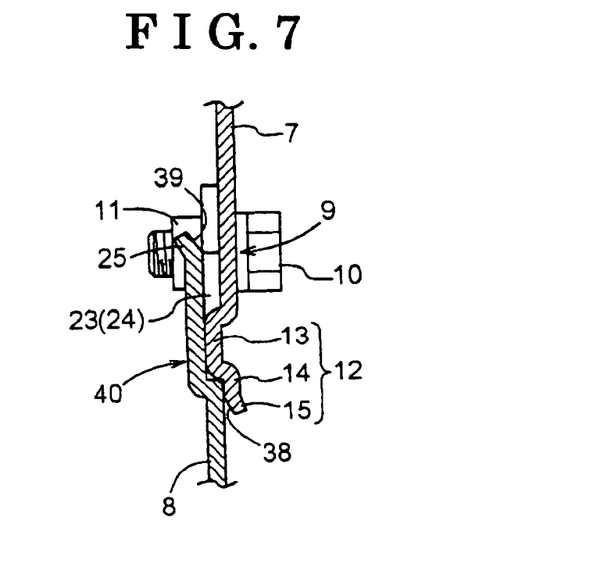
FIG. 7 is a sectional view of a contact portion between a lower bracket and a seat cushion frame according to the second embodiment of the present invention.

As illustrated in FIGS. 6 and 7, the seat cushion frame 8 is formed with contact surfaces (side surfaces 42a and 42c of a guide groove 23 described below) for guiding the lower bracket 7 to a correct rotation position about the rotational shaft of the seatback frame 2 relative to the seat cushion frame 8 at the time of the assembling of the lower bracket 7 and the seat cushion frame 8. Illustrated in FIG. 7 is a condition in which the lower bracket engage portion 13 is placed at the correct rotation position, i.e., a condition in which the lower bracket engage portion 13 is engaged with a seat cushion frame engage portion 24.

More specifically, the guide groove 23 formed by chasing the seat cushion frame 8 is provided at the seat cushion frame 8 at a surface placed outside of the seat apparatus. The guide groove 23 includes a bottom surface 41 extending in parallel with the seat cushion frame 8 and side surfaces 43a, 43b, and 43c extending perpendicular to the seat cushion frame 8. As illustrated in FIG. 6, the guide groove 23 is formed into substantial trapezoid. The guide groove 23 is provided at a position in which the guide groove 23 can be in contact with the lower bracket engage portion 13 in a condition where the positioning of the upper portion (the seatback frame 2, the reclining mechanism 3, and the lower bracket 7) and the lower portion (the seat cushion frame 8) of the seat apparatus are performed while sliding the upper portion relative to the lower portion. In other words, when the lower bracket engage portion 13 slides along an inside of the guide groove 23 at the time of the assembling of the lower bracket 7 and the seat cushion frame 8, the side surfaces 42a and 42c of the guide groove 23 and the side surfaces 43a and 43b of the lower bracket engage portion 13 are in contact with each other within a plane perpendicular to the axial direction of the outer shaft 4. In consequence, the lower bracket engage portion 13 is guided to the correct rotation position placed at the side surface 42b side by means of the guide groove 23. The seat cushion frame engage portion 24 is configured by the use of a step between a surface of the seat cushion frame 8 and the guide groove 23. The lower bracket engage portion 13 is formed by bending the protrude portion 12 of the lower bracket 7 so that the engage portion 13 can be engaged and hooked into the aforementioned step. Accordingly, the side surfaces 42a and 42c of the guide groove 23 represent a contact surface of the present invention.

Further, a width of the guide groove 23 is large in the vicinity of a reflex portion 25, at which the lower bracket 7 starts to contact with the seat cushion frame 8, and the width of the guide groove 23 is narrowed down so as to reach to the side surface 42b of the guide groove 23. More particularly, the guide groove 23 is formed into substantial trapezoid as illustrated in FIG. 6. Accordingly, in the beginning of the positioning of the lower bracket 7 relative to the seat cushion frame 8 while sliding, the lower bracket 7 is not required to be placed at the correct rotation position about the rotational shaft of the seatback frame 2. As the lower bracket engage portion 13 approaches to the side surface 42b side of the guide groove 23, the side surfaces 42a and 42c of the guide groove 23 are in contact with the side surfaces 43a and 43b of the lower bracket engage portion 13 and the lower bracket engage portion 13 is finally guided to the correct rotation position (a condition illustrated in FIG. 7) in a reliable manner.

As well as the first embodiment of the present invention, the inclined surface 38 is formed at the end portion of the lower bracket 7 and the inclined surface 39 is formed at the end portion of the seat cushion frame 8. In a condition where the lower bracket engage portion 13 and the seat cushion frame engage portion 24 are engaged at the engaging portion 40, the engage portion 13 is in contact with the inclined surface 39 and is guided to the seat cushion frame engage portion 24. The inclined surfaces 39 and 38 are configured so that the inclined surface 39 is bent away from the lower bracket 7 toward a tip of the end portion of the seat cushion frame 8 and the inclined surface 38 is bent away from the seat cushion frame 8 toward the tip of the end portion of the lower bracket 7. More specifically, in a condition where the lower bracket 7 and the seat cushion frame 8 are fixed and in contact with each other, the end portion (the tip portion 14) of the contact portion of the lower bracket 7 is formed into a reflex portion 15 (the inclined surface 38) which is bent so as to be apart from the seat cushion frame 8. Further, the end portion of the contact portion of the seat cushion frame 8 is formed into a reflex portion 25 (the inclined surface 39) which is bent so as to be apart from the lower bracket 7. Accordingly, when the lower bracket engage portion 13 and the seat cushion frame engage portion 24 are engaged in a condition where the upper portion and the lower portion of the seat apparatus are assembled, the lower bracket 7 and the seat cushion frame 8 can relatively be moved along the axial direction of the outer shaft 4 by contacting the inclined surface 38 of the lower bracket 7 with the inclined surface 39 of the seat cushion frame 8. The seat cushion frame engage portion 24 represents the engage portion of the seat cushion frame.

Accordingly, even when the lower bracket 7 and the seat cushion frame 8 are placed apart from each other along the axial direction of the outer shaft 4 in a condition where the positioning of the lower bracket 7 and the seat cushion frame 8 is performed, the positioning of the lower bracket 7 and the seat cushion frame 8 can appropriately be performed. Further, the right and left seat cushion frames 8 can readily be fitted to the inside of each lower bracket 7. In other words, the right and left lower brackets 7 can reliably sandwich and slide at the outside of the right and left seat cushion frames 8 without being mistakenly placed at the inside of the right and left seat cushion frames 8. In consequence, the assembling of the upper portion and the lower portion of the seat apparatus can readily be performed.

As well as the first embodiment of the present invention, the side surfaces 42a and 42c of the guide groove 23 and the side surfaces 43a and 43b of the lower bracket engage portion 13 represent the restricting surface which restricts the relative rotation of the lower bracket 7 and the seat cushion frame 8 in a condition where the lower bracket 7 and the seat cushion frame 8 are engaged.

Figure 8:
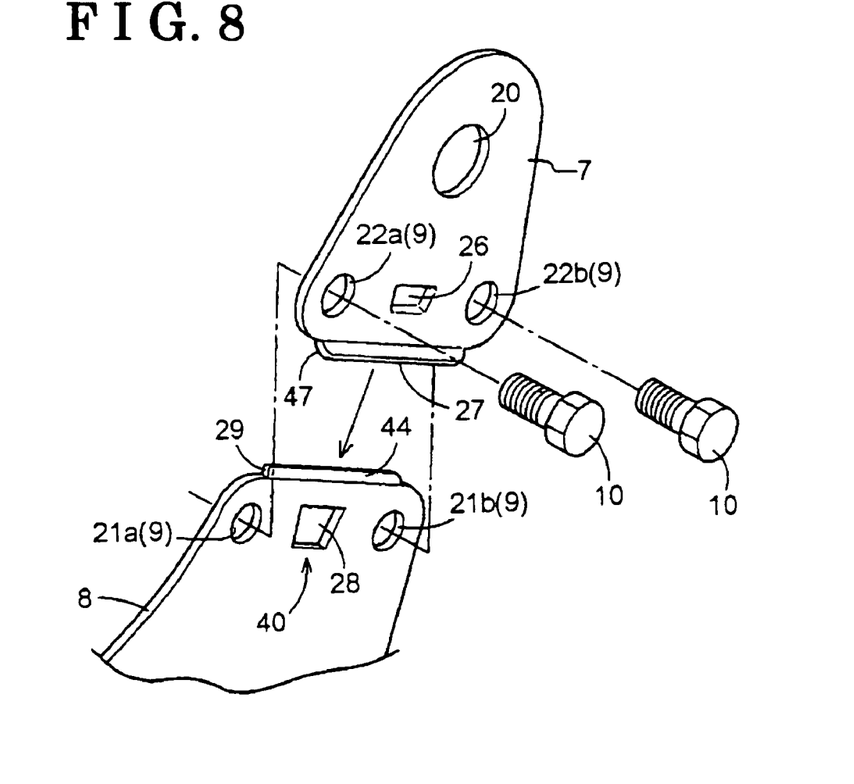
FIG. 8 is an exploded perspective view of a seat apparatus for a vehicle according to a variation of the present invention.
Figure 9:
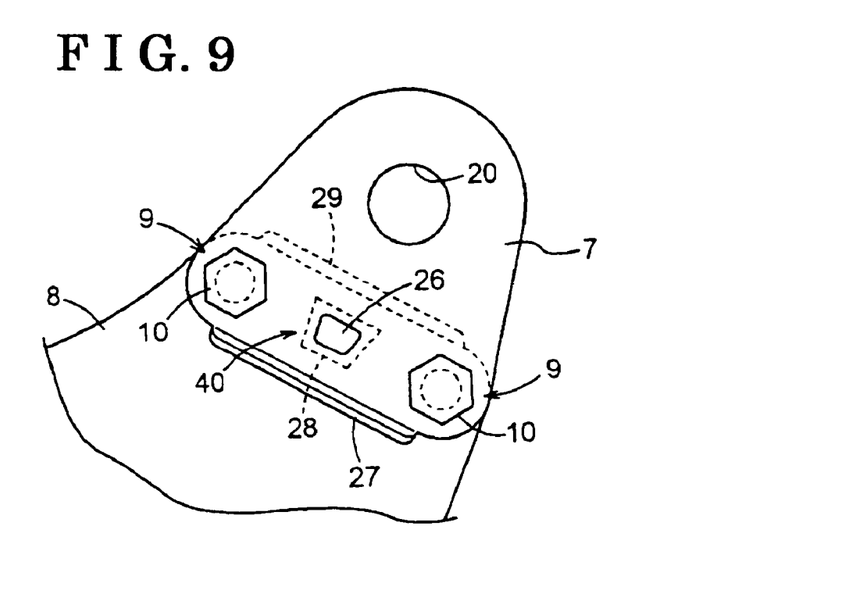
FIG. 9 is a side view of the seat apparatus shown in FIG. 8 in a condition where a lower bracket and a seat cushion frame are engaged.

According to the aforementioned embodiments of the present invention, the lower bracket engage portion is provided between the two fastening portions 9 and is deviated from the straight line connecting the two fastening portions 9. However, the present invention is not limited thereto. Alternatively, or in addition, the lower bracket engage portion may be provided at the other position. According to a variation of the present invention, the lower bracket 7 includes the engaging portion 40 (a lower bracket engage portion 26 and a seat cushion frame engage portion 28) provided on the straight line connecting the two fastening portions 9 as illustrated in FIGS. 8 and 9. More specifically, the lower bracket 7 is provided with the lower bracket engage portion 26, which is formed by pressing means and has a stepped portion, on the straight line connecting the two fastening portions 9. Further, the seat cushion frame engage portion 28 is a through hole formed on the straight line connecting the two fastening portions 9.

As well as the aforementioned embodiments, a reflex portion 27 and an inclined surface 47 are formed at the end portion of the lower bracket 7 and a reflex portion 29 and an inclined surface 44 are formed at the end portion of the seat cushion frame 8.

Figure 10:
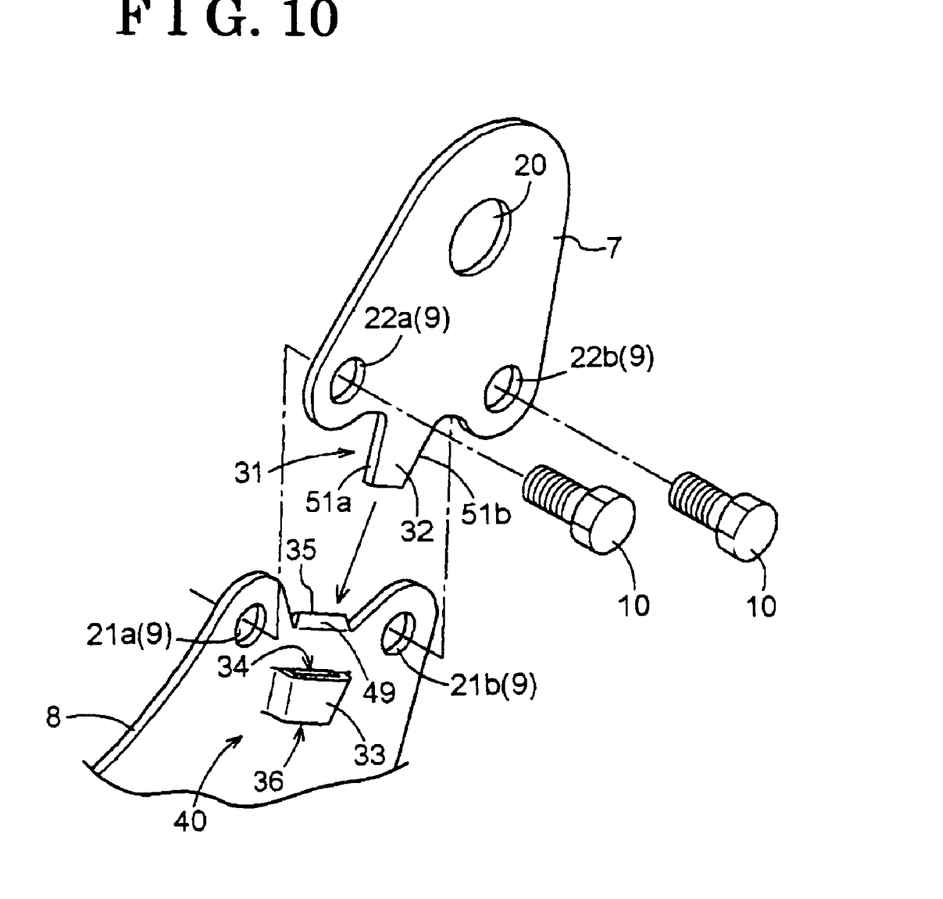
FIG. 10 is an exploded perspective view of a seat apparatus for a vehicle according to another variation of the present invention.
Figure 11:
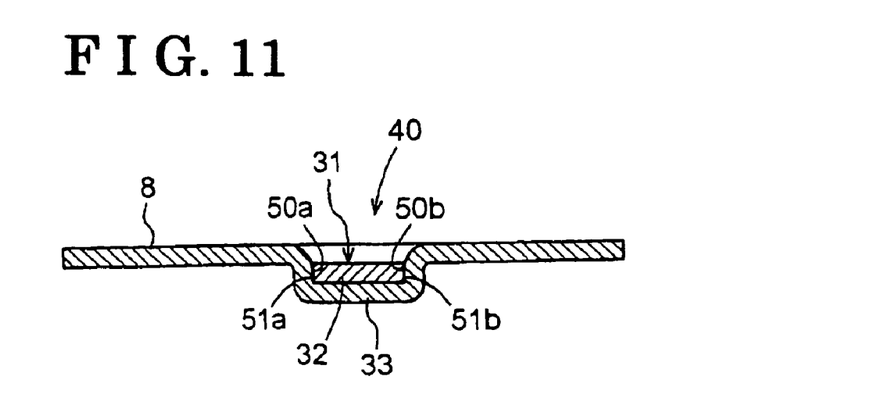
FIG. 11 is a sectional view of an engaging portion of the seat apparatus for a vehicle shown in FIG. 10.

According to the aforementioned embodiments of the present invention, the lower bracket engage portion having a stepped portion is engaged with the seat cushion frame engage portion having a stepped portion or a hole. However, the present invention is not limited thereto. Alternatively, or in addition, the lower bracket engage portion may be formed into substantial plate without a step portion. For example, as illustrated in FIGS. 10 and 11, a seat cushion frame engage portion 33 may be formed into substantial cylinder by selectively pressing a portion between two slits formed at the seat cushion frame 8. Further, a protrude portion 31 is provided between the fastening holes 22a and 22b, serving as the two fastening portions 9, and is deviated from the straight line connecting the two fastening portions 9. The protrude portion 31 functions as a lower bracket engage portion 32 which is engaged with the seat cushion frame engage portion 33.

According to the aforementioned variation of the present invention, when the lower bracket 7 and the seat cushion frame 8 are relatively slid in a condition where the right and left lower brackets 7 sandwich the right and left seat cushion frames 8 from both sides, the lower bracket engage portion 32 is inserted into a first opening 34 of the seat cushion frame 8 and is protruded from a second opening 36 of the seat cushion frame 8. More specifically, the lower bracket engage portion 32 is engaged with the seat cushion frame engage portion 33 formed at the seat cushion frame 8 between the first and second openings 34 and 36. Accordingly, at a part in which the seat cushion frame engage portion 33 is provided, outer surfaces of the lower bracket engage portion 32 are in contact with the seat cushion frame engage portion 33. Further, at the other part being different from the part in which the seat cushion frame engage portion 33 is provided, an inner surface of the lower bracket engage portion 32 is in contact with the seat cushion frame 8.

As illustrated in FIG. 10, the lower bracket engage portion 32 and the seat cushion frame engage portion 33 are formed into substantial trapezoid. Further, as illustrated in FIG. 11, a cross section of the seat cushion frame engage portion 33 includes substantial rectangle. As well as the second embodiment of the present invention, the seat cushion frame engage portion 33 is formed with contact surfaces (inner side surfaces 50a and 50b of the seat cushion frame engage portion 33 described below) for guiding the lower bracket 7 to the correct rotation position about the rotational shaft of the seatback frame 2 relative to the seat cushion frame 8 at the time of the assembling of the lower bracket 7 and the seat cushion frame 8. Illustrated in FIG. 11 is a condition in which the lower bracket 7 is guided to the correct rotation position, i.e., a condition in which the lower bracket engage portion 32 is engaged with the seat cushion frame engage portion 33. More specifically, when the lower bracket engage portion 32 slides along an inside of seat cushion frame engage portion 33, the inner side surfaces 50a and 50b of the seat cushion frame engage portion 33 and side surfaces 51a and 51b of the lower bracket engage portion 32 are in contact with each other within a plane perpendicular to the axial direction of the outer shaft 4. Accordingly, as the lower bracket engage portion 32 is inserted into the seat cushion frame engage portion 33, the inner side surfaces 50a and 50b of the seat cushion frame engage portion 33 are in contact with the side surfaces 51a and 51b of the lower bracket engage portion 32 and the lower bracket engage portion 32 is finally guided to the correct rotation position (a condition illustrated in FIG. 11) in a reliable manner. Accordingly, the inner side surfaces 50a and 50b of the seat cushion frame engage portion 33 represent the contact surface of the present invention.

As well as the aforementioned embodiments of the present invention, a reflex portion 35 and an inclined surface 49 are formed at the end portion of the seat cushion frame 8 as illustrated in FIG. 10.

Further, as well as the aforementioned embodiments of the present invention, the inner side surfaces 50a and 50b of the seat cushion frame engage portion 33 and the side surfaces 51a and 51b of the lower bracket engage portion 32 represent the restricting surface which restricts the relative rotation of the lower bracket 7 and the seat cushion frame 8 in a condition where the lower bracket 7 and the seat cushion frame 8 are engaged.

According to the aforementioned embodiments and the variations of the present invention, the restricting surface, which restricts the relative rotation of the lower bracket 7 and the seat cushion frame 8 in a condition where the lower bracket 7 and the seat cushion frame 8 are engaged, includes a linear surface. However, the present invention is not limited thereto. The restricting surface may take any shape as long as the restricting surface can restrict the relative rotation of the lower bracket 7 and the seat cushion frame 8. For example, according to the embodiment of the present invention, the lower bracket engage portion 13 and the seat cushion frame engage portion 17 are formed into substantial rectangle and the restricting surfaces 43a, 43b, 52a, and 52b include the linear surface as illustrated in FIG. 3. Alternatively, or in addition, the lower bracket engage portion 13 and the seat cushion frame engage portion 17 may be formed into substantial ellipse. With such variation, the restricting surface can also restrict the relative rotation of the lower bracket 7 and the seat cushion frame 8. On this occasion, the restricting surface includes a curved surface.

In the aforementioned embodiments and the variations of the present invention, it is not described at which one of the lower bracket 7 and the seat cushion frame 8 the inclined surface is required to be formed. The present invention is applicable as long as the inclined surface is formed at at least one of the end portion of the lower bracket 7 and the seat cushion frame 8. Further, according to the embodiments and the variations of the present invention, the inclined surface is formed by bending the end portion of the lower bracket 7 and the seat cushion frame 8, i.e., the inclined surface is formed by forming the reflex portion. However, the reflex portion may not necessarily be formed. Alternatively, or in addition, the inclined surface may be obtained by forming at least one of the end portions of the lower bracket 7 and the seat cushion frame 8 into tapered shape.

According to the aforementioned embodiments and the variations of the present invention, the contact surface, which guides the lower bracket 7 to the correct rotation position about the rotational shaft of the seatback frame 2 relative to the seat cushion frame 8, is formed on the seat cushion frame 8. However, the present invention is not limited thereto. Alternatively, or in addition, the contact surface may be formed on the lower bracket 7.

According to the aforementioned embodiments and the variations of the present invention, the seat cushion frame engage portion is formed into the groove, the hole, or the cylinder. However, the present invention is not limited thereto and the shape of the seat cushion frame engage portion may include a combination of the groove, the hole, and the cylinder. For example, the seat cushion frame engage portion includes the groove as illustrated in FIG. 6. Alternatively, or in addition, the hole illustrated in FIG. 3 may be formed at an end portion of the groove of the seat cushion frame engage portion, i.e., the hole may be formed at the side surface 42b side, and the lower bracket engage portion may be fitted into and engaged with the hole.

According to the embodiments of the present invention, the seat apparatus for a vehicle is provided with the seat cushion frame, the lower bracket fastened and fixed to the seat cushion frame, and the seatback frame mounted to the lower bracket through the reclining mechanism so as to be pivotally supported by the lower bracket. The lower bracket and the seat cushion frame are fastened and fixed with each other at the two fastening portions and are engaged at the engaging portion.

With the aforementioned configuration, the force applying to the lower bracket and the seat cushion frame can be dispersed and received at the two fastening portions and the engaging portion. In consequence, it can be prevented from focusing the large force to only one of the two fastening portions and the engaging portion. More specifically, the large force, by which the components of the seat apparatus such as the lower bracket or the seat cushion frame would be deformed, is not applied to any one of the two fastening portions and the engaging portion. Accordingly, the lower bracket and the seat cushion frame can firmly be connected relative to the conventional art without increasing the number of the components between the lower bracket and the seat cushion frame relative to the conventional art. Further, increase in the number of processes for fastening the lower bracket and the seat cushion frame, the number of the components, and the weight can be restricted.

According to the embodiments of the present invention, the engaging portion is provided between the two fastening portions and is deviated from the straight line connecting the two fastening portions.

When the seatback frame is applied with the force in a lateral direction of the seat apparatus, i.e., in a direction along the axial direction of the rotational shaft of the seatback frame, the lower bracket and the seat cushion frame, which are connected to the seatback frame, are also applied with the force in the lateral direction of the seat apparatus. On this occasion, according to the conventional seat apparatus, because the lower bracket and the seat cushion frame are fastened and fixed at the two fastening portions, the force may be focused on the straight line connecting the two fastening portions, and the lower bracket and the seat cushion frame may easily be folded. However, according to the embodiments of the present invention, even when the seatback frame is applied with the force in the lateral direction of the seat apparatus, i.e., in the direction along the axial direction of the rotational shaft of the seatback frame, the force can be received at the two fastening portions and the engaging portion. Therefore, because a part of the force can be borne by the engaging portion, folding force between the lower bracket and the seat cushion frame can be eased and the seat apparatus can be prevented from being damaged.

According to the embodiments of the present invention, the engaging portion includes the restricting surface which restricts the relative rotation of the lower bracket and the seat cushion frame in a condition where the lower bracket and the seat cushion frame are engaged.

With the aforementioned configuration, even when the lower bracket and the seat cushion frame are not fastened and fixed at the fastening portions, the relative rotation of the lower bracket and the seat cushion frame can be restricted by means of the restricting as long as the lower bracket and the seat cushion frame are engaged at the engaging portion. Accordingly, the lower bracket and the seat cushion frame can readily be fastened by fastening the lower bracket with the seat cushion frame.

According to the embodiments of the present invention, the inclined surface is formed at at least one of the lower bracket and the seat cushion frame. In a condition where the lower bracket and the seat cushion frame are engaged at the engaging portion, the inclined surface is in contact with the engage portion of the other one of the lower bracket and the seat cushion frame for guiding the engage portion of the other one of the lower bracket and the seat cushion frame to the engage portion of the one of the lower bracket and the seat cushion frame.

With the aforementioned configuration, because the inclined surface is formed at at least one of the lower bracket and the seat cushion frame, the engage portion of the other one of the lower bracket and the seat cushion frame is in contact with the inclined surface and is guided to the engage portion of the one of the lower bracket and the seat cushion frame at the time of the assembling of the lower bracket and the seat cushion frame. Accordingly, the lower bracket and the seat cushion frame can readily be assembled.

According to the embodiments of the present invention, the inclined surface is configured so as to be separated away from the other one of the lower bracket and the seat cushion frame toward the tip of the end portion of the one of the lower bracket and the seat cushion on which the inclined surface is formed.

With the aforementioned configuration, when the lower bracket and the seat cushion frame are in contact with each other at the inclined surface formed at at least one of the lower bracket and the seat cushion frame, the lower bracket and the seat cushion frame can relatively be moved along the axial direction of the rotational shaft of the seatback frame. Therefore, even if the lower bracket and the seat cushion frame are placed apart from each other along axial direction of the rotational shaft of the seatback frame in a condition where the positioning of the lower bracket and the seat cushion frame is performed at the time of the assembling thereof, the positioning of the lower bracket and the seat cushion frame can appropriately be performed.

According to the embodiments of the present invention, the contact surface, which guides the lower bracket to the correct rotation position about the rotational shaft of the seatback frame relative to the seat cushion frame at the time of the assembling of the lower bracket and the seat cushion frame, is provided at one of the lower bracket and the seat cushion frame.

With the aforementioned configuration, the lower bracket can be guided to the correct rotation position about the rotational shaft of the seatback frame relative to the seat cushion frame by contacting the lower bracket with the seat cushion frame at the contact surface. Therefore, when the positioning of the lower bracket and the seat cushion frame is performed at the time of the assembling thereof, the lower bracket can reliably be guided to the correct rotation position.

The principles, preferred embodiment and mode of operation of the present invention have been described in the foregoing specification. However, the invention which is intended to be protected is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising:
a seat cushion frame;
a lower bracket fixed to the seat cushion frame;
a seatback frame attached to the lower bracket through a reclining mechanism so as to be pivotally supported relative to the lower bracket;
two fastening portions fastening the lower bracket and the seat cushion frame;
a lower bracket engaging portion in the lower bracket, the lower bracket engaging portion including a first side surface and a second side surface at both sides of the lower bracket engaging portion in a longitudinal direction of the seat apparatus;
a seat cushion frame engaging portion in the seat cushion frame, the seat cushion frame engaging portion including a third side surface and a fourth side surface at both sides of the seat cushion frame engaging portion in the longitudinal direction of the seat apparatus;
the third side surface of the seat cushion frame engaging portion and the first side surface of the lower bracket engaging portion engaging one another, and the fourth side surface of the seat cushion frame engaging portion and the second side surface of the lower bracket engaging portion engaging one another;
one of the lower bracket engaging portion and the seat cushion frame engaging portion being a through hole, and the other of the lower bracket engaging portion and the seat cushion frame engaging portion being positioned in the through hole; and
the lower bracket engaging portion and the seat cushion frame engaging portion being arranged between the two fastening portions.

2. The seat apparatus for a vehicle according to claim 1, wherein the lower bracket engaging portion is spaced from a straight line connecting the two fastening portions.

3. The seat apparatus for a vehicle according to claim 2, further comprising an inclined surface formed at least at one of the lower bracket and the seat cushion frame, and contacting the other of the seat cushion frame and the lower bracket.

4. The seat apparatus for a vehicle according to claim 3, wherein the inclined surface is inclined away from the other one of the lower bracket and the seat cushion frame toward a tip of an end portion of the one of the lower bracket and the seat cushion on which the inclined surface is formed.

5. The seat apparatus for a vehicle according to claim 1, wherein the third and fourth side surfaces of the seat cushion frame engaging portion and the first and second side surfaces of the lower bracket engaging portion constitute restricting surfaces for restricting relative rotation of the lower bracket and the seat cushion frame.

6. The seat apparatus for a vehicle according to claim 5, further comprising an inclined surface formed at least at one of the lower bracket and the seat cushion frame, and contacting the other of the seat cushion frame and the lower bracket.

7. The seat apparatus for a vehicle according to claim 6, wherein the inclined surface is inclined away from the other one of the lower bracket and the seat cushion frame toward a tip of an end portion of the one of the lower bracket and the seat cushion on which the inclined surface is formed.

8. The seat apparatus for a vehicle according to claim 1, further comprising an inclined surface formed at least at one of the lower bracket and the seat cushion frame, and contacting the other of the seat cushion frame and the lower bracket, the inclined surface portion being positioned along an edge of the one of the lower bracket and the seat cushion frame.

9. The seat apparatus for a vehicle according to claim 8, wherein the inclined surface is inclined away from the other one of the lower bracket and the seat cushion frame toward a tip of an end portion of the one of the lower bracket and the seat cushion on which the inclined surface is formed.

10. The seat apparatus for a vehicle according to claim 8, wherein the inclined surface is formed at the lower bracket engaging portion, the inclined surface inclining toward an outer side in a width direction of the seat apparatus, and further comprising an inclined surface at the seat frame engaging portion that inclines toward an inner side in the width direction of the seat apparatus.

11. The seat apparatus for a vehicle according to claim 1, wherein the lower bracket engaging portion comprises one of a convex portion and a concave portion at which is provided the first side surface and the second side surface, and the seat cushion frame engaging portion has the other one of the convex portion and the concave portion at which is provided the third side surface and the fourth side surface.

12. A seat apparatus for a vehicle, comprising:
a seat cushion frame;
a lower bracket fixed to the seat cushion frame;
a seatback frame attached to the lower bracket through a reclining mechanism so as to be pivotally supported relative to the lower bracket;
two fastening portions fastening together the lower bracket and the seat cushion frame;
a through hole in one of the lower bracket and the seat cushion frame, the through hole possessing an endless inner peripheral surface;
a protrusion provided on the other of the lower bracket and the seat cushion frame, the protrusion being positioned in the through hole and possessing an outer surface surrounded by and facing the inner peripheral surface of the though hole; and
the through hole and the protrusion being arranged between the two fastening portions.

13. The seat apparatus for a vehicle according to claim 12, wherein a straight line connecting the two fastening portions intersects the through hole.

14. The seat apparatus for a vehicle according to claim 12, further comprising an inclined surface formed at least at one of the lower bracket and the seat cushion frame, and contacting the other of the seat cushion frame and the lower bracket.

15. A seat apparatus for a vehicle, comprising:
a seat cushion frame;
a lower bracket fixed to the seat cushion frame, the lower bracket having a lower side;
a seatback frame attached to the lower bracket through a reclining mechanism so as to be pivotally supported relative to the lower bracket;
first and second through holes in the lower bracket which pass through the lower bracket in a thickness-wise direction of the lower bracket, and first and second through holes in the seat cushion frame which pass through the seat cushion frame in a thickness-wise direction of the seat cushion frame;
a first bolt passing through the first through hole in the lower bracket and the first through hole in the seat cushion frame, and a second bolt passing through the second through hole in the lower bracket and the second through hole in the seat cushion frame;
a third through hole passing through the seat cushion frame in the thickness-wise direction of the seat cushion frame, the third hole being spaced from the lower side of the lower bracket so that the third through hole does not open to the lower side of the lower bracket;
a protrusion on the lower bracket, the protrusion being positioned in the third through hole, the protrusion possessing an outer periphery entirely surrounded by an inner periphery of the third through hole, the protrusion being completely surrounded by a portion of the lower bracket devoid of the protrusion; and
the third through hole being located between the first and second through holes in the lower bracket, the protrusion being located between the first and second holes in the seat cushion frame.

16. The seat apparatus for a vehicle according to claim 15, further comprising an inclined surface formed at a lower end of the lower bracket and an upper end of the seat cushion frame.

17. The seat apparatus for a vehicle according to claim 15, wherein a straight line connecting the two fastening portions intersects the through hole.

* * * * *